United States Patent

[11] 3,633,412

[72] Inventor Edmond R. Pelta
Pacific Palisades, Calif.
[21] Appl. No. 39,570
[22] Filed May 21, 1970
[45] Patented Jan. 11, 1972
[73] Assignee Autoscan, Inc.
Los Angeles, Calif.
Continuation of application Ser. No. 790,812, Jan. 13, 1969, now abandoned. This application May 21, 1970, Ser. No. 39,570

[54] EQUIPMENT FOR TESTING THE BRAKES OF AUTOMOBILES
38 Claims, 4 Drawing Figs.

[52] U.S. Cl. .................................................. 73/126, 73/132
[51] Int. Cl. ..................................................... G01l 5/28

[50] Field of Search ........................................... 73/117, 123, 126, 132, 133

[56] References Cited
UNITED STATES PATENTS
1,987,706  1/1935  Prentiss ........................ 73/126

Primary Examiner—Jerry W. Myracle
Attorney—Smyth, Roston & Pavitt

ABSTRACT: Brake-testing equipment is disclosed for measuring brake response and effort and brake distance. High-inertia rolls are drivingly coupled to the wheels and different reactions between wheels, rolls and constant speed roll drive for the rolls are ascertained as to instantaneous responses as well as integrated effects. Brake pedal force is ascertained concurrently. Measuring values are represented by electric signals processed electronically. Processing includes formation of products and ratios using Hall devices.

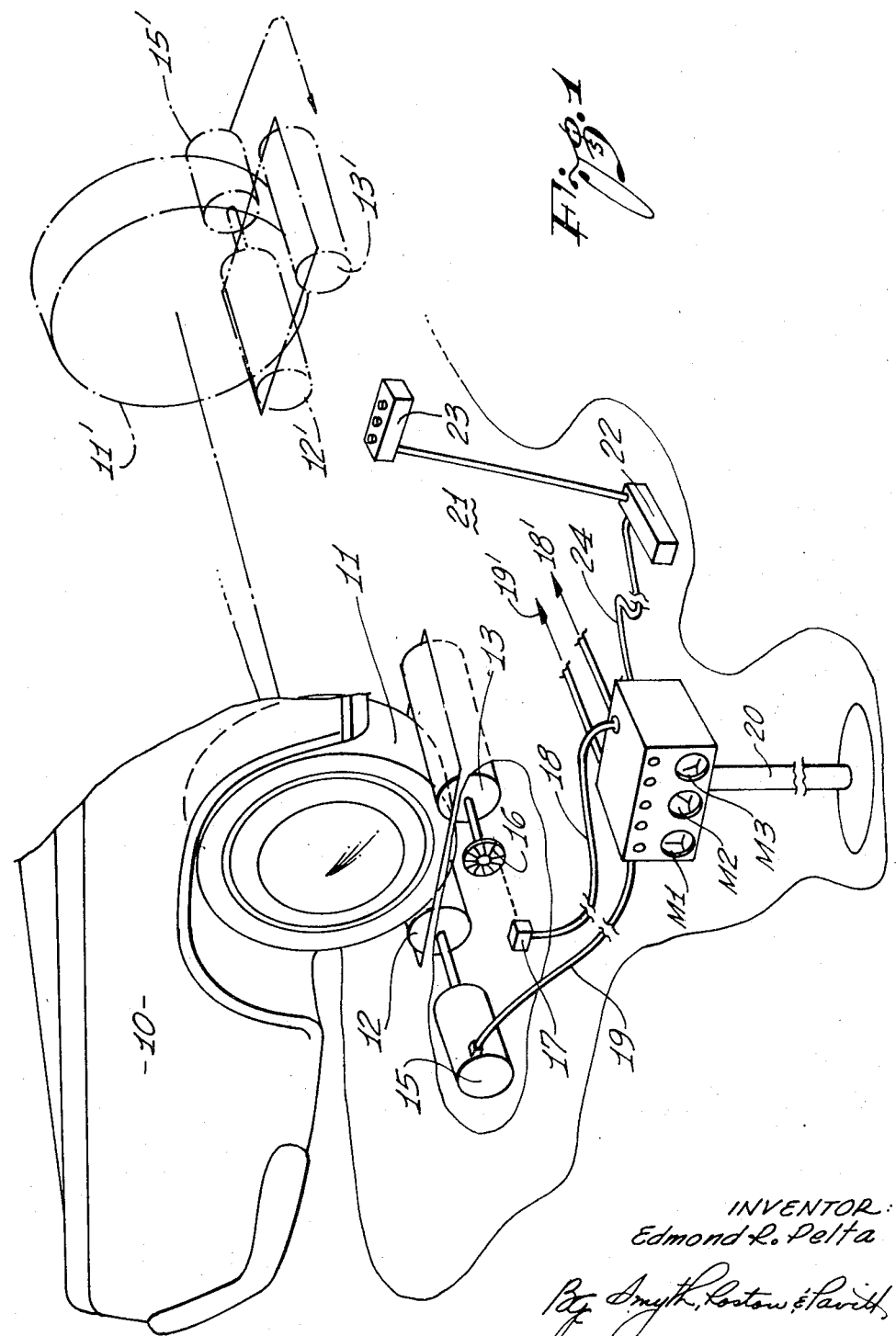

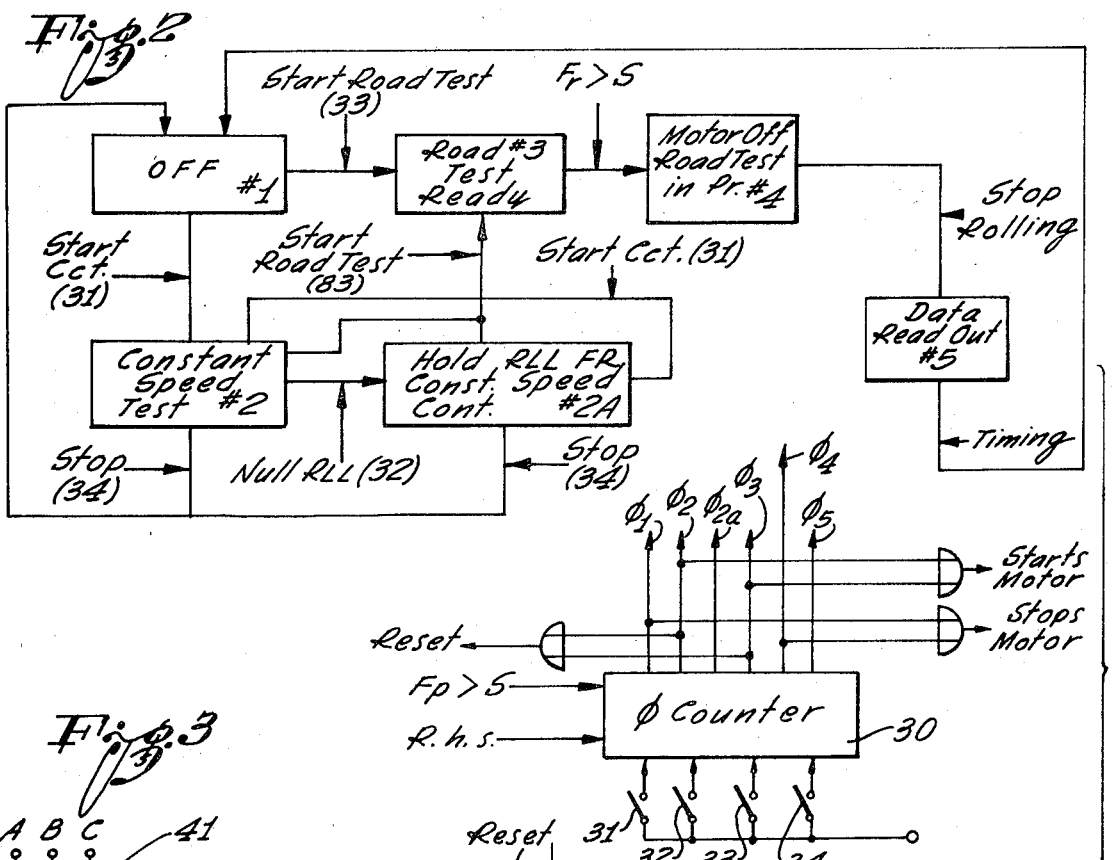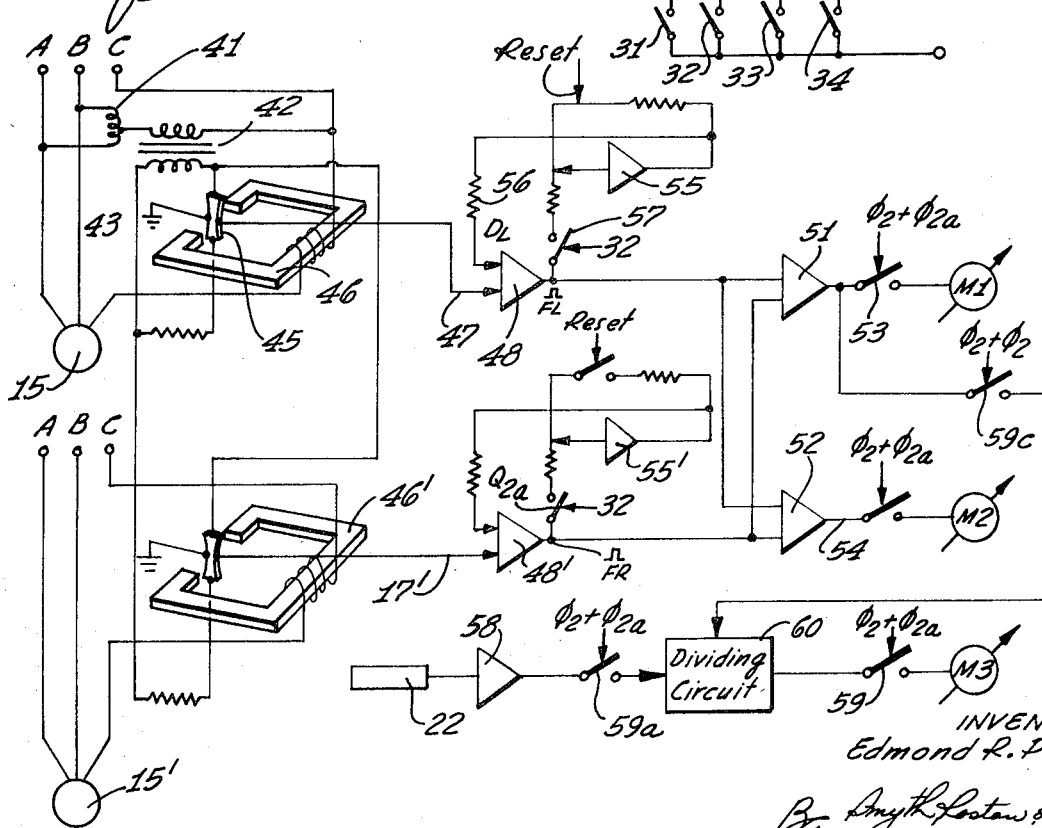

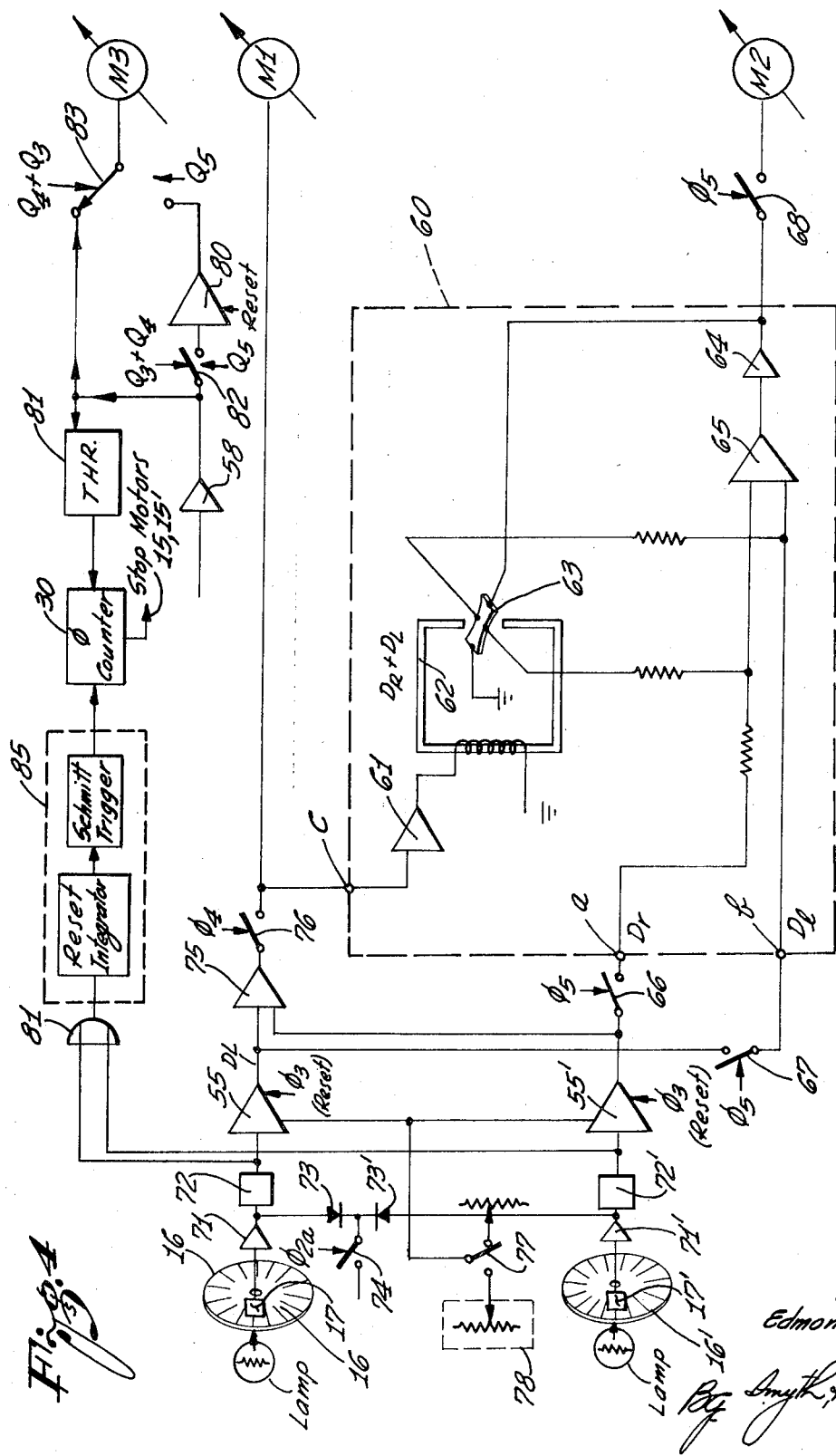

EQUIPMENT FOR TESTING THE BRAKES OF AUTOMOBILES

This is a continuation of Ser. No. 790,812 (now abandoned) filed Jan. 13, 1969 and entitled "Equipment for Testing the Brakes of Automobiles."

The present invention relates to brake-testing equipment, particularly for testing the brakes of an automobile. The need for equipment providing test data on the performance of the brakes in an automobile is self-evident.

The brake system of a car has many different coacting parts so that brakes can be "bad" for many different reasons. Any defect will ultimately show up in the increase of the stopping distance measured from the position of the moving vehicle at the time the operator begins to apply the brakes up to the position of the vehicle when it has come to a complete stop. However, judging performance on basis of measured braking distance alone poses several problems. One problem stems from the fact that stopping distance includes, for example, as a subjective parameter, the force exerted by the operator upon the brake pedal. The condition of the tires is another variable parameter as the friction between tires and road or road-simulating means is a contributing factor in the stopping distance. Thus, unless previous tests have been made with the same vehicle, by the same operator, and for similar tires, only statistical data on average stopping distance values are available to serve as a reference for comparison. Moreover, the multitude of parameters involved permits only the establishing of reference data in form of rather large ranges. Therefore, such a test can, at best, determine whether the performance falls within certain ranges for the stopping distance permitting some rough classification as to "good," "bad," "very bad," etc.

Where the brakes are very bad, a long braking distance can be ascertained readily on such basis, but in such cases, a test is almost superfluous as the driver of the vehicle may have noticed already that the brakes do not operate properly. This leads to the point that a more important aspect for such test equipment is that it permits to ascertain whether the brakes are about to operate unsatisfactorily. In other words, the beginning of the deterioration or breakdown process should be determined for obvious reasons of safety as early as possible. This is not possible if the reference data are on too coarse a scale. Additionally, too long a stopping distance, per se, does not at all indicate any specific cause for the unsatisfactory performance or even an impending deterioration.

It follows, therefore, that brake testing should include procurement of data permitting a diagnosis, not only to what extent, but why the brakes are bad. The condition of brakes should be analyzed from two different points of view. One relates to brake response, to the instantaneously available braking power or brake effort, and to the rate of change thereof. The other point is, as was already mentioned, the braking distance, i.e., the distance it takes the vehicle to come to a complete stop from a particular speed. However, such distance should be ascertained in a manner which eliminates the variable parameters to permit establishing and meaningful employment of a finely charted set of reference data. Braking distance when measured in conjunction with results of a brake response test and when taken further in conjunction with applied pedal force and under consideration of rolling friction permit a considerably more meaningful comparison with correspondingly more meaningful reference data.

A response analysis alone does not yield complete information on an undue extension of the braking distance, but it is the latter, so to speak, which summarizes the overall performance of the brake, while, when taken alone, telling little as to causes of defective brakes. On the other hand, a still satisfactory braking distance may have come about by more forceful than usual application of the brakes by the operator so that only a response analysis and an inclusion of pedal force representation yields indication that (and why) the brakes are in the process of losing capability of satisfactory performance.

It is, therefore, an object of the present invention to provide brake-testing equipment permitting response analysis as well as braking distance measurement in a simulated road test. It is another object of the invention to provide response and road tests with essentially the same power equipment, while different tests are conducted by employing different circuits but on time-sharing basis of components and instruments.

The system, in accordance with the preferred embodiment of the invention, includes a pair of roll means for respective engagement with the front wheels or with the rear wheels of the vehicle the brakes of which are to be tested. The roll means have a momentum of inertia corresponding to a particular average weight of vehicles expected to be tested. The roll means of the pair are individually driven by motor means having constant speed vs. torque characteristics in the range of interest, and preferably having also linear power input vs. torque characteristics.

For various response tests, also called summarily constant speed test mode or just constant speed test, the motor means drives the roll means which, in turn, drives a pair of the wheels through frictional engagement. Brakes are applied during the test in various ways to test the available brake force as well as various responses to the application of the brake pedal. For this the power inputs of the two motor means are determined by ascertaining current and voltage and providing signals representing actual power to obtain quantative representation of the various brake efforts as electrical signals. The signals are processed electrically to obtain particularly information as to balance of brake forces of the two wheels and to obtain further, the ratio of total brake force or effort to force applied to the brake pedal during the test.

The road test is conducted by turning the motor means off as brakes are applied, and by measuring the path traveled by the roll means until being stopped through the torque transmission to the roll means from the wheels, which are subject to braking. This travel path of the roll means is ascertained through counting. For example, measuring discs, such as slotted discs, are coupled to the roll means for providing pulses in cooperation with a stationary scanner. Each pulse represents a particular distance of simulated vehicle propagation. The pulses are integrated, i.e., counted by analog or by digital methods. The rate of the pulses determines the speed of the roll means and the integral thereof represents braking distance accordingly. This counting-integration process is carried out separately for the two wheels as they engage the roll means of the pair. Electrical signals represent these distances and are processed to show average braking distance as well as relative unbalance. Concurrently the brake pedal force is measured and averaged or integrated.

Pulse integration by analog methods is preferred for the following reasons. If the vehicle has a weight which is different from the one represented by the momentum of inertia of the particular roll means, the pulse height is modified. For example, for a higher vehicle mass and for an inertia higher than the assumed average value the braking distance will actually be longer than the one measured at the assumed average inertia. By increasing the signal representing braking distance, a more representative brake distance measuring value is established.

The response tests during the constant speed test mode can be conducted with the rolling equipment used for the road test as the constant speed motor characteristics prevents the inertia of the rolls from unduly delaying the response of the motor, particularly as to power input change when the torque at the motor shaft changes due to application of the brakes. The load increase resulting from brake application during the constant speed test, the force exerted upon the brake pedal, and the rolling distance during the simulated road tests, are all represented by electrical signals developed in electronic, i.e., high-speed equipment to permit electrical signal processing for obtaining readily representative and illustrative indication of brake performance and response. The processing includes, in several cases, the providing of ratios of input signals. For this a Hall device is used in which the divisor signal controls the magnetic field, the desired ratio signal controls the Hall excitor current, and the Hall generator voltage is combined with the dividend to control the production of the excitor current for obtaining the desired ratio value therewith.

The system, furthermore, includes circuits operating particularly for the constant speed test mode, which can hold and store the measuring value representative of the power input for the motor means when the brakes are not applied. Such measuring value represents the rolling friction and has significance for the evaluation of all test data. As such rolling friction represents the frictional coupling between roll means and the tires (which may be in good condition or worn out) an additional reference for the brake distance measurement is obtained. Moreover, the signal representing rolling friction can then be introduced into the measuring circuit to obtain an output value of zero representing brake force zero and the increase in power requirement for the motor means when the brakes are applied are scaled from that reference value.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically and in perspective view the essential parts of the equipment used for testing brakes of an automobile, particularly the brake of one wheel thereof;

FIG. 2 is a schematic representation of several test phase sequences for conducting the several tests with the equipment shown in FIG. 1;

FIG. 3 illustrates a circuit diagram for the components participating in the conduction of the constant speed test mode and including circuit elements used likewise during other modes; and FIG. 4 illustrates a block diagram and partially a circuit diagram for the conduction of the road tests with the equipment shown in FIG. 1.

Turning now specifically to FIG. 1, a wheel 11 of a vehicle 10 is shown as having been positioned on a pair of rolls 12 and 13 in frictional driving engagement therewith. Coupling of the rim of tire 11 to the rolls is obtained solely through friction under the weight of the vehicle. A similar pair of rolls 12′ and 13′ is provided for engagement with the other wheel 11′ which is in respective axial alignment with wheel 11. The rolls 12, 13, 12′, 13′ are suitably placed in a sunken support, so that the vehicle can simply be driven until wheels 11 and 11′ rest on the rolls as illustrated.

The rolls have significant weight so that their momentum of inertia is the equivalent of a vehicle weighing about 3,800 pounds. That is to say, the momentum of inertia of the rolls is such that it takes the same time to stop a pair of rolls from a particular circumferential speed as it takes a vehicle of 3,800 pounds to stop from that speed as the brakes are being applied, but when driving power is not applied to the rolls (and to the vehicle).

The roll 12 is at times driven by a motor 15 which, for reasons below, is a constant speed motor such as a three-phase induction motor. Roll 13 is an idler. Rolls 12′ and 13′ as coupled to the other wheel 11′ are driven by a similar motor 15′. A slotted disc 16 is coupled to one of the rolls, in this case roll 13, but it could also be coupled to roll 12. Disc 16 cooperates with a stationary scanner 17 monitoring the passage of the slots upon rotation of the disc. A cable 18 links scanner 17 with a measuring signal processing and indicating unit 20 which may be an instrument box mounted on a standing column to position the plurality of instruments at a suitable height for operating personnel. A cable 19 links the same unit 20 also with motor 15, particularly the electric input circuit thereof. Cables 18′ and 19′ as schematically indicated, link unit 20 with scanner 17′ (not shown in FIG. 1) and motor 15′.

The brake tester includes, furthermore, a pedal force gauge 21 having a transducer section 22 which can be coupled to the brake pedal in the vehicle to measure the braking force applied to the brake by the test equipment operator. It was found convenient to place several of the control switches for the entire system into a control box 23 attached to and being part of pedal force gauge 21. A cable 24 links control box 23, as well as the gauge proper, with the processing unit 20.

The processing unit 20 includes three meters, M1, M2 and M3, each having more than one scale for different usage during different tests. Unit 20 or unit 23, or both, may be provided with appropriate indicator lamps to indicate to the test equipment operator the phase or operating state in which the testing equipment is at any instant. During conduction of the test, the test equipment operator sits in the driver seat of the vehicle to operate gas and brake pedals. The instrument and signal-processing processing unit 20 stands outside with meters M1, M2 and M3, clearly visible to him. The operator will then run through the different tests by manipulating the proper control buttons and switches at control box 23; he will also observe the meters and chart their indication.

The test operation, in general, as well as the various operating and testing phases of the equipment will now be described with reference to FIG. 2. The equipment permits essentially the conduction of two types of tests already mentioned above and denoted respectively, the constant speed test and the road test. During the constant speed test brake force is measured by measuring the increase in input power for motors 15 and 15′ upon application of brakes. During the road test a representation of stopping distance is developed.

Before describing in detail the phases defining the two types of tests or test modes, reference is made to a phase counter 30 which forms part of the equipment illustrated in FIGS. 3 and 4, but is included in FIG. 2 to facilitate the description of the several phase sequences. This phase counter 30 receives a plurality of input signals in order to establish at an instant, one of the following phases respectively identified by phase signals $\emptyset1, \emptyset2, \emptyset2a, \emptyset3, \emptyset4$ and $\emptyset5$. Several of these input signals are provided by four switches 31 through 34 or control box 23. The switches are presumed to be spring-biased pushbuttons, establishing new conditions for phase connector 30 when pressed. When released, the newly established phase is maintained until either another switch is pressed or other phase-changing inputs are received by phase counter 30.

Aside from these four input switching signals a "$F_p > S$" signal generated in control unit 20 constitutes another input for phase counter 30; it is this a signal which represents whether any significant brake force is applied during the road test sequence, and marks the beginning of metering the braking distance. A "rolling has stopped" signal (R.h.s. for short) is provided during the road test sequence to signal the completion of metering braking distance when in accordance with the simulation the vehicle has come to a complete stop, i.e., when rolls 13 and 13′ have been caused to stop. In addition, the phase counter 30 may have as one of its inputs, a speed-responsive signal to permit the road test proper to begin only after the motors have obtained rated speed.

Aside from certain logic operations in unit 20 and which will be described with greater detail below, phase counter 30 controls starting and stopping of motors 15 and 15′. The motors are started when phases 2 or 3 are entered. The motors are stopped when phase 1 or phase 4 begins. The phase counter 30 provides also a reset signal for integrators and other components operated and maintained during phases 2 and 3.

The test sequences and phases shall now be described in general terms. Normally, of course, the equipment is in the off phase 1. This phase is particularly characterized by an off-state or stop condition of the motors 15 and 15′. As stated, the vehicle to be tested is driven so that, for example, the front wheels set on and engage the two roll pairs 12, 13 and 12′ and 13′. It is immaterial which test is conducted first, but normally one will begin with the constant speed test sequence. This is done by pressing the constant speed control button 31 and motors 15 and 15′ will be started. The system shifts into the constant speed test phase 2, and phase signal $\emptyset2$ is produced throughout that phase. An indicator lamp on unit 20 or box 23 may be provided to indicate to the test equipment operator when motors 15 and 15' have obtained full or rated speed. This will take approximately a few seconds.

As stated, unit 20 is coupled by means of cables 18 and 18' to the input circuits for motors 15 and 15', to meter their respective power input. Of course, during the initial acceleration phase such value obtained now is of no consequence. After the motor has reached rated speed and without the brakes being applied, the power inputs for motors 15 and 15' are respectively indicative of the power necessary to overcome the friction between wheels 11 and 11', on one hand, and rolls 12, 13 and 12', 13', on the other hand, to maintain rated speed. During phase 2 meter M2 indicates the difference in power input for the two motors. As long as the brakes are not applied, the difference indicated represents difference in traction by the two tires. Concurrently, meter M1 indicates total traction of the two tires.

Regarding phase 2 further, the brake pedal will be applied in various ways during this phase, whereupon meter M1 will indicate the average brake effort, which, in effect, is the average power requirement for the motors 15 and 15' to maintain rated speed even though the brakes are being applied. The meter M2 indicates the difference in the power requirement and thereby indicates brake unbalance as to the two wheels. Meter M3 indicates the ratio of the total brake effort (sum of power requirement for motors 15 and 15') over the pedal force as sensed by transducer 22. Phase 2 is thus the principal test phase during which the operator tests effectiveness and response of the brakes for slow and fast brake application, slow and fast release, and fade of brake effectiveness after continued application for a few seconds, whereby for each such test the combined effect for both wheels, the difference and the ratio to the applied pedal force is indicated and can be charted.

In order to obtain indications on brake effort, brake unbalance and brake effort to pedal force ratios, which are not influenced by the rolling friction, the test equipment operator causes the system to shift into a different phase. First, he will release the brakes, thereby allowing the metering and processing unit to settle to values which are indicative of the rolling friction. Then he will press the "null rolling friction" control switch 32, also conveniently located in the control box 23, whereupon the system shifts into the phase 2A, also called "hold rolling friction-constant speed test" phase, and meters M1, M2 and M3 return to zero. During this phase 2A the operator can again apply the brakes, and the measuring values he will now read from meters M1, M2 and M3, are essentially as mentioned above, however, the rolling friction is excluded from the indicated values, i.e., the power requirements for motors 15 and 15' attributable to overcoming the rolling friction are eliminated from the measuring output during that phase 2A. If the test equipment operator again wishes to include the rolling friction in the measuring values, he simply presses the start constant speed test button 31, whereupon the system establishes again phase 2. It is, of course, optional to conduct any brake response tests in phase 2, or in phase 2A, or in both phases.

Either phase 2 or phase 2A can be exited by pressing the stop button 34, establishing the off phase 1, and the corresponding phase signal ∅1 simply removes power from the motor, and the test is terminated. An alternative exit from phases 2 or 2A occurs upon pressing the "start road test" switch 33 to establish the "road test ready" phase 3. If the motors are already running (as is the case if phase 3 is entered into from phases 2 or 2A) operative phase control switch 33 merely provides the necessary logic circuit changes in the signal-processing unit 20. If the "start road test" button 33 is pressed while the system is in the "off" phase 1, motors 15 and 15' have to start, i.e., the system can enter phase 3 also from phase 1.

The system stays in "road test ready" phase 3 with motors running until the brake pedals are ever so slightly actuated. As outlined above, the purpose of the road test is to establish the braking distance under simulated road conditions. Therefore, the system will enter the "road test in progress" phase 4 after the "road test ready" phase has been established, and upon application of brake force to the pedal. This is symbolized by the signal mentioned above, $F_p > S$, the $S$ meaning that the brake pedal force monitored by transducer 22 must exceed a response and sensitivity threshold value $S$ before the phase 4 can be established.

Principal aspect of "road test in progress" phase 4 is that the motors 15 and 15' are turned off at the beginning in that power is removed from them immediately as phase 4 is entered. Throughout this phase, brake force is being applied and under the influence of that force, tires 11 and 11' will decelerate rolls 12, 13, 12' and 13', aided, of course, by the rolling friction which is in this case a desirable influence as it duplicates actual conditions, particularly with regard to the state of the tires. During test phase 4 the circumferential path of progression of the rolls and, therefore, of the wheels is determined until the rolls come to a stop.

Progression of the wheels is metered by the scanning device 17 for wheel 11 and by the corresponding device 17' for wheel 11'. As soon as the slotted disc 16, etc., ceases to rotate, unit 20 indicates a "rolling has stopped" condition and issues the R.h.s. signal which terminates the "road test in progress" phase 4. After phase 4 has been terminated, the system shifts into the "data readout" phase 5 during which meter M1 indicates the stopping distance. M2 indicates the comparison of distance to arrive at a stop between the right and left wheels. Meter M3 indicates the time integral of the pedal force applied during phase 4.

It should be mentioned that as the road test is in progress (phase 4), meter M1 merely indicates that progress, which is of no significance. The indication provided by M2 during phase 4 may be of some significance as it shows the developing of an unbalance. However, during phase 4, meter M3 indicates actual pedal force and, therefore, assists the test equipment operator to be included as a "human feedback loop" to maintain, for example, a constant and particular pedal force.

Indicator phase 5 could be maintained indefinitely, but it may be more practical to permit readout for a particular period of time only, and after that period has elapsed it is assumed that the indicated values have been registered, charted, recorded, etc., by the operator and the system shifts itself back into the off phase 1. It will be noted that this phase change involves only logic changes within the unit 20, the motors have been turned off previously.

Proceeding now to the discussion of FIG. 3, the components participating in the conduction of the constant speed test phases are illustrated partially as circuit diagram, partially as block diagram. The figure, of course, shows motors 15 and 15' and their connections to a three-phase electric power supply system A, B, C. It is desirable and necessary for operating the test equipment as described to obtain an adequately accurate measuring value for the power input for each of the motors 15 and 15'. The power input is, of course, proportional to the product of voltage and current as is delivered to the motors times the cosine of the phase shift between current and voltage. As induction motors are employed, that phase shift is significant and varies for different loads (torque) so that the relation between torque and current alone is very nonlinear.

In view of the fact that a local three-phase power supply system may or may not have a natural zero or reference point, such zero or reference potential has to be established in order to be independent from the local power supply as to this point. This is done by connecting, for example, the phases A and B to an inductance 41 having a center tap to which is connected one side of the primary winding of a transformer 42 connected with its other side to phase C. The secondary winding 43 of this transformer, therefore, provides a voltage proportional to the voltage in phase C relative to an assumed zero or reference point.

The secondary winding 43 is connected to each of the two current input electrodes of two Hall generators 45 and 45', there being additional load resistors for each of these two parallel secondary load circuits. Therefore, the two Hall generators each receive current that is proportional to the voltage supplied to motors 15 and 15'. It is, of course, assumed that the two motors are connected to the same power system, A, B, and C, so that a single, phantom-phase network to establish a zero reference point can be employed for the two Hall circuits measuring the power input for each of the motors. In other words, the voltage input component is the same for both motors and, therefore, for both power-measuring circuits.

Each of the two Hall generators is under the influence of a magnetic field respectively provided by a magnetic core 46 of Hall generator 45 and by a magnetic core 46' for Hall generator 45'. The cores are magnetically energized through the currents flowing through phase C respectively to motors 15 and 15'. These currents may well differ if the loads for the motor differ. The Hall voltages, therefore, are proportional each to the product of voltage and of the respective current fed to the two motors 15 and 15'. One of the voltage-sensing electrodes of each Hall generator is respectively grounded, the other electrodes are respectively connected to signal lines 47 and 47' to provide signals which are respectively proportional to the power input of motors 15 and 15'.

A preamplifier 48 and a preamplifier 48' respectively, connected to lines 47 and 47', provide signals denoted F$l$ and F$r$, which are measuring signals and represent the individual power requirement for motors 15 and 15' at any instant. The output signals F$l$ and F$r$ are first fed to a summing amplifier 51, providing, therefore, algebraically the signal F$l$+F$r$. The symbol (+) represents here an analog addition, not a logic or function. This sum signal F$r$+F$l$ is passed to the meter M1 during phases 2 and 2A. As symbolically indicated through a logic or symbol in the drawing, a switch 53 can be closed by either of the two phase signals $\phi 2$, $\phi 2a$ to connect the output of summing amplifier 51 to the meter M1. Of course, through proper calibration the meter M1 can be made to indicate actually (F$r$+F$l$)/2 if that is desired. A differential amplifier 52 receives the two signals F$l$ and F$r$ to provide signal F$r$−F$l$. During phase 2 and as well, during phase 2A, signal F$r$−F$l$ is fed by a phase-signal-operated switch 54 to the meter M2 which, therefore, provides visible indication of the brake effort unbalance.

It can, therefore, be seen and reference is made specifically to the description above of the various test phases, that at any time during the constant speed test, motors 15 and 15' run at constant speed as torque and power input vary, possibly over a wide range to establish representation of brake effort for the several test procedures. Total brake effort is indicated by the meter M1, and brake unbalance, i.e., the difference in effective braking forces is indicated by meter M2.

A very linear power-torque characteristic of the induction motors 15 and 15' employed is beneficial for using the electric power input directly as a representation of applied torque and brake effort. More important, however, are the particular characteristics of the induction motors, viz very flat-speed-torque characteristics. In other words, the speed of the motors changes little with torque and load over a wide range of torques and load. Accordingly, load changes are not accompanied by significant acceleration and deceleration phases.

As heavy rolls 12 and 13 undergo very little acceleration and deceleration for different torques provided by the motor, any torque and power input changes for the motors are almost exclusively attributable to brake force changes. Thus, the momentum of inertia of the rolls does not introduce any significant response delay into the system; any additional torque of the motor (and any additional power input) is effective more or less, instantly upon brake application and in full representation of such brake force as additional load even though such force is transmitted from brake to motor through the rolls as transmission element, but that transmission does not involve their inertia. The same holds true for brake releases, particularly a sudden brake release, which is likewise instantaneously effective in the input circuit of the motor.

An analysis shows that the response delay between a load change and a resulting change power input for the motor decays with an exponential function, i.e., the transfer characteristics between load and power input, for a step change of load has a modifying factor of ($1-\exp{-kt}$). The exponential factor $k$ is proportional to the rate of change of the torque with speed of the motor. For an ideally constant speed motor that rate is infinity corresponding to a transfer characteristics without delaying transient component. Thus, $k$ can be made high by selecting a motor having near ideally constant speed-torque characteristics.

The factor $k$ is inversely proportional to the momentum of inertia of the rolls times the angular speed of the rolls. Hence, a high roll speed and a high inertia of the rolls tends to reduce factor $k$, so that the flatness of the speed-torque characteristics must be made to dominate the factor $k$ to be sufficiently large. Decisive is that $kt$ is already large shortly after a time interval $t$ has elapsed which could be regarded as a negligible delay period from a load change, so that exp-$kt$ drops rapidly to zero. It was found that a three-phase induction motor satisfies the requirement. An overrated synchronous motor, of course, would still give better performance, but for the purpose of the invention, and for the time periods involved, a more economical induction motor suffices.

The circuit as described thus far provides measuring values which include the rolling friction. Once the motors have been brought up to a constant and rated speed such as 45 m.p.h. and brake force is not applied, signals F$l$ and F$r$ represent the power input for motors 15 and 15' necessary to overcome rolling friction. As stated, the resulting indications on meters M1 and M2 are also significant as M1 will indicate to what extent inflation, vehicle loading or brake drag may extend the braking distance and to what extent worn tires cause slippage between them and the rolls, as that may be the cause for a response delay. Any difference in rolling friction indicated at meter M2 represents differently worn tires. These measurements may thus be charted to be used for reference purposes.

In order to eliminate the influence of rolling friction (and, therefore, the influence of the conditions of the tires) from measuring results as to brake response, the system is shifted into the phase 2A by operating the "null rolling friction" switch 32. Thereupon the output amplifier 48 providing signal F$l$ is connected to the input of an integrator 55. The output of integrating amplifier 55 is fed through a resistor 56 to a negative or inverting input of Hall signal amplifier 48. The connection lasts for the duration of holding down switch 32. During phase 2 the reset signal is applied to integrator 55, to close particularly an input-cancelling feedback circuit. Hence, as phase 2A is entered, the integrator 55 has zero input and output at first.

As switch 32 is pressed, phase 2 is terminated and the reset circuit is disabled, so that the other loop for integrator 55 running through amplifier 48 takes over. As switch 32 is held down the integrator 55 runs up. As soon as the output of amplifier 55 equals the signal in line 47, amplifier 48 receives canceling inputs, so that the input of integrator 55 drops to zero and its output stabilizes. Assuming the integrator 55 has a long time constant, it provides a fixed value equal to the rolling friction signal in line 47, even after switch 32 is released. The output of amplifier 48 is and stays zero, as long as the signal in line 47 remains equal to the output of amplifier 55 (as modified by resistor 56).

An analogous operation takes place at amplifier 48', providing right-wheel rolling friction signal F$r$. An integrator 55' is coupled through a resistor 56' to the inverting output of amplifier 48' and zero output is established for amplifier 48' shortly after switch 32 closes. Upon release of switch 32, amplifier 55' holds its output which is equal to the signal in line 47' (subject to modification by resistor 56').

These conditions will be established shortly after the "null rolling friction" control button 32 has been pressed; there is some delay due time constants of the integrator. The test equipment operator will observe meters M1 and M2 as they drop to zero, whereupon he can release switch 32. As now the brakes are applied by him, signals Fr and Fl produced under these newly established conditions exclude the rolling friction because integrators 55 and 55' continue to apply the respective rolling friction equivalents to the inverting, i.e., subtracting inputs of amplifiers 48 and 48'. The response tests can now be conducted in the same manner as described.

As mentioned above, a third measuring value of interest is indicated by meter M3 during the constant speed test. This measuring value is the ratio between braking effort and applied pedal force. In FIG. 3 there is shown again the pedal force pressure transducer 22, and its output signal is applied to a preamplifier 58, providing a brake pedal signal $F_p$. Signal $F_p$ is applied to a dividing or ratio-forming circuit 60 which will be described in greater detail with reference to FIG. 4.

The dividing network 60 has inputs $a$ and $c$ for respectively receiving dividend and divisor. During phase 2 and 2A, signal $F_p$ is applied through a closed switch 59a divisor to the divisor input of $a$ dividing network 60. The dividend is taken from the output of summing amplifier 51 and fed through switch 59c to the input $c$ of dividing network 60. Switches 59a and 59c are closed by operation of phase signals $\phi 2$ and $\phi 2a$.

The output of the dividing circuit 60 is, accordingly, a signal which represents a ratio between the total brake effort and applied pedal force, i.e., $(Fr+Fl)/F_p$. This output of dividing circuit 60 is fed through phase-operated switch 59 to the meter M3. It will be appreciated that the output provided by meter M3 is the best objective indication as to brake effort and response at any instant, as it excludes any subjectivity inherent in an indication as provided by meter M1, which provides the absolute total brake response inherently depending on the pedal force. The indication of meter M3 in phase 2A, i.e., after exclusion of the rolling friction from the $(Fr+Fl)F_p$ ratio is probably the best possible representation for the conditions of the brakes itself.

Proceeding now to the description of FIG. 4, there is illustrated the equipment operating during the road test sequence. It will be recalled that for the road test sequence it is necessary to bring motors 15 and 15' up to a particular speed at first and that upon subsequent application of the brakes, the motors are stopped. Rolls 12, 12' and 13, 13', etc., continue to roll under their inertia until stopped due to retardation by the wheels which are subject to braking force. It will be recalled also from the general description of the various phases above that the road test sequence can be entered into initially (i.e., from phase 1) or after a constant speed test, i.e., the latter can be discontinued at any time to conduct the road test. In either case, the road test is begun by pressing the "start road test operating" switch 33, whereupon the system shifts into the phase 3. It takes a few seconds until the motors have reached rated speed and an indicator lamp will light up after the motors have obtained that speed so that rolls and wheels rotate corresponding to a simulated road speed of, for example, 45 m.p.h.

As mentioned above, with reference to FIG. 1, a slotted disc 16 and an analogous disc 16 respectively rotate when left and right wheels of the tested vehicle rotate. Each of the discs has a plurality of slots, and light sources direct light toward the discs, scanned on the respective other side by scanning devices 17 and 17', respectively. The output signals of the scanners are provided to preamplifiers 71 and 71'. Alternating detections of a slot and of a spoke between slots by the scanners result in oscillating or pulsating output signals of amplifiers 71 and 71' to respectively trigger one-shots or monovibrators 72 and 72'. Therefore, these one-shots 72 and 72' operate as pulse generators for providing pulses at particular amplitudes and at a rate which is precisely a replica of the rotation of the rolls.

Output pulses of monovibrators 72 and 72' each have a particular time-voltage integral and they are fed respectively to integrators 55 and 55'. Thus, integrators 55 and 55' mentioned above participate also in that road test, but their inputs and outputs are provided and used in a different manner. In order to prepare these integrators for proper operation, therefore, during phase 3 reset signals are continuously applied to feedback circuits to establish zero input and output of the integrators as long as the phase 3 prevails. During phase 3 the integrators are reset continuously, so that the reception of the pulses by them has no effect during that phase.

The output pulses of the monovibrators 72 and 72' could be used throughout any of the phases as a direct speed representation if such a representation were desired. This is particularly so as discs 16 and 16' rotate during phase 2 and 2A. However, as was mentioned above, integrators 55 and 55' are used otherwise during phase 2A, so that the scanning circuits must be decoupled from the integrators during that phase. The outputs of the two amplifiers 71 and 71' are interconnected through two diodes 73 and 73', and the common junction of them can be connected to ground when phase-operated switch 74 is closed. As switch 74 is closed, the outputs of the amplifiers 71 and 71' are grounded so that neither of the one-shots 72 and 72' can be triggered during constant speed test phase 2A. Presently the road test is conducted so that switch 74 is open. Nevertheless, integrators 55 and 55' are continuously reset during phase 3 so that the speed and roll progression indicating pulses are not integrated. However, during phase 3 the pulses of one of the two monovibrators could be used to directly provide rate, i.e., speed indication for informing the test equipment operator on the roll speed and when to begin the road test.

The road test begins as soon as the test equipment operator touches the brake pedal for more, say, than an insignificant, accidental touching. A threshold device 81 is connected to amplifier 58 producing always brake pedal signal $F_p$. If the brake pedal force as represented by $F_p$ exceeds a particular threshold value S representing a pedal force below forces usually used for affecting braking, device 81 responds. As was mentioned above, such a response brings about a phase change as it is used in phase counter 30 to terminate phase 3 and begin phase 4. In other words, the beginning of the road test is made largely independent from the degree with which the operator begins to apply the brake, so that the road test can be conducted with different degrees of force as to brake application.

As soon as phase 4 is entered into, the reset signal for integrators 55 and 55' is removed. Switch 74 is already open. Phase 4 signal $\phi 4$ also turns motors 15 and 15' off so that any continued rotating motion in the system is solely due to the inertia of the rotating elements, particularly rolls 12, 12', 13 and 13' (FIG. 1). Such rotation is now retarded by the brakes. Integrators 55 and 55' will respectively begin to analog-count, i.e., integrate the pulses furnished by one-shots 72 and 72' respectively. The output signals of integrators 55 and 55' are denoted $Dl$ and $Dr$ respectively for this phase, and they are measuring values in representation of peripheral progression of the several rolls in simulation of traveling distances of the two vehicle wheels. $Dl=Dr=0$ at the beginning of phase 4 as integrators 55 and 55' were reset up to that time. Thus, traveling distance is metered for each wheel-roll system from the beginning of first brake application which caused change from phase 3 to phase 4. These output signals $Dl$ and $Dr$ are fed to a summing amplifier 75. A switch 76 is operated by phase signal $\phi 4$ to connect amplifier 75 to meter M1 during the "road test in progress" phase 4. The particular scale of the meter M1 is calibrated to show, in effect, $(Dr+Dl)2$ which is the average distance of simulated vehicle progression.

The equipment is designed to provide for a vehicle weight correction through a bias control circuit which is connected to an input circuit portion of integrators 55 and 55' to modify the amplitude of the pulses integrated. A switch 77, when in the illustrated position, provides a fixed bias to integrators 55 and 55' to establish conditions for a vehicle having an inertia equivalent to a weight of 3,800 pounds. That inertia value is used to select the inertia of the rolls for road test simulation. However, not all vehicles have that weight, and in order to provide a more realistic simulation for a vehicle of a different weight, a potentiometer or adjustable resistor 78 can be included in this integrator-biasing circuit in the alternative position of switch 77.

Particular adjustment of potentiometer 78, therefore, modifies the amplitude of the integrator input pulses so that the measuring values $Dl$ and $Dr$ are not the true distances as covered by the rolls for this reason. A heavier vehicle finds that the rolls simulate a vehicle that is lighter so that it can stop the rolls in a shorter distance that it could stop itself. The potentiometer thus adjusts metered distance for such heavier vehicle to be longer than the actual distance it took the rolls to stop. The reverse is true for a lighter vehicle. Therefore, potentiometer 78 can be adjusted to correct values $Dl$ and $Dr$ accordingly for the different weights.

During the road test the force applied to the brake pedal is indicated by meter M3. Accordingly, during phase 4 a switch 83 connects meter M3 to the output of amplifier 58 providing the signal $F_p$, which was defined above as a brake pedal force representation signal. Switch 83 may already be closed by signal $\phi3$ so that the entire circuit is, in fact, prepared for the road test during that phase. The running indication of brake pedal force aids the test equipment operator to hold a steady pedal force, particularly if testing with less than full force. During phases 3 and 4 the output signal $F_p$ of amplifier 58 is also applied via a phase-operated switch 82 to another integrator 80. During phases 3 and others, integrator 80 is and remains reset. As soon as phase 4 is entered into, the reset signal is removed from integrator 80 so that it provides the brake force integral as it progresses in time. However, the progressing value is not indicated during phase 4 as there seems to be no need.

An OR-gate 81 connects the two pulse generators 72 and 72' to a minimum pulse sequence detector 85 to determine when pulse generators 72 and 72' have ceased to provide pulses in representation of a complete stop of the two wheels. One can readily ascertain that the rolling system is not capable of rotating below a particular threshold speed for a particular period of time. When that time has elapsed, the rolling system must have come to a stop, and no more pulses can be expected from either of the pulse generators 72 and 72'. Therefore, the detector 85 includes a reset integrator, which is reset by each pulse as it appears at OR-gate 81. If the integrator is permitted to run for that critical period after the last pulse from any of the generators 72 and 72', the reset integrator has reached a particular level to which a Schmitt trigger in device 85 responds, and this output signal is regarded as representation that the rolling system has come to a full stop. The output signal of detector 85 as specifically provided by the Schmitt trigger therein is the "rolling has stopped" signal R.h.s. used to terminate phase 4.

The "stop rolling indication," therefore, causes the system to shift into the data-indicating phase 5. Integrators 55 and 55' hold values $Dl$ and $Dr$, and meter M1 indicates the actual braking distance. As soon as phase 5 is entered into, switch 83 changes position to connect the output of integrator 80 to the input of meter M3. Concurrently, switch 82 is opened by the signal $\phi5$ in order to remove the output of amplifier 58 from the input of integrator 80, so that the integrator holds the integrated value of the total brake pedal force as was applied throughout the period from beginning of applying the brakes up to the time the vehicle came to a full stop in the road test simulation period.

One could provide a ratio-forming device or dividing network and an additional indicating instrument to provide directly an indication of $$(Dr+D1)/2 \int F_p,$$

because divider 60 and meter M2 are used otherwise as will be described shortly. The indications of meters M1 and M3 are both of significant value in order to evaluate the actual stopping distance under the applied brake pedal force conditions. The test may be repeated, for example, for different pedal forces in order to obtain significant information, as to different users.

The input for meter M2 during the road test sequence has not yet been described; it is this, the output of the dividing network 60 to be described in the following in greater detail. During the road test, particularly during data readout phase 5, meter M2 is to indicate the relative brake effort unbalance which is defined by the difference in braking distances for the two wheels over the average braking distance, i.e., by the ratio of $$\frac{Dr-D1}{(Dr+D1)/2}$$

The factor 2 could be included through calibration of the scale of the meter and is actually not needed as far as ratio formation is concerned.

The relative unbalance ratio is formed in the network 60 during phase 5 as follows: Signal $Dr+Dl$, of course, is available as the output of amplifier 75. This signal is passed through phase-operated switch 76 to input C of divider 60, constituted by the input of an amplifier 61 for driving a magnet 62. Magnet 62 establishes a magnetic field for energizing a Hall generator 63. The energizing current for the Hall generator is provided by an amplifier 64 which, in turn, is controlled by an operational amplifier 65.

The operational amplifier 65 has a noninverting (direct) and an inverting input. The noninverting, direct input is connected to provide the input $a$ of network 60. The inverting input establishes a second input $b$ for the network 60. The dividend is thus actually the input at $a$ minus the input at $b$. For reasons of completion, it should be mentioned that during phases 2 and 2A, when network 60 is being used otherwise, only input thereof $a$ was mentioned there to receive the dividend for that mode. Input $b$ is grounded for the two phases 2 and 2A.

Input $a$, for example, receives the signal D1 which is the output of integrator 55, as during phase 5 a switch operated by signal $\phi5$ connects the output of integrator 55 to input $a$. Additionally, the noninverting input of amplifier 65 is connected to one of the voltage-sensing electrodes of Hall generator 63. A switch 67 operated by signal $\phi5$ connects the output of integrator 55' to input $b$, so that the inverting input of operational amplifier 65 receives the output D1 of integrator 55; additionally that inverting input of amplifier 65 is connected to the other voltage-sensing electrode of Hall generator 63. The system stabilizes if the voltage across the Hall generator is, in fact, equal to $Dr-D1$. The voltage across the Hall generator, therefore, establishes itself to be equal to the $Dr-D1$. Amplifier 64 provides an energizing current which establishes such a Hall voltage in conjunction with the magnetic field. As the Hall voltage ($Dr-D1$) is proportional to the product of the magnetic field (which is proportional to $Dr+D1$) and of the Hall generator excitor current, that current, i.e., the output current of amplifier 64 is, in fact, proportional to $Dr-D1/Dr+D1$. By means of shunting it is thus possible to draw from network 60 a measuring voltage which is proportional to that ratio, and it is this voltage which drives meter M2 during phase 5. A switch 68 operated by phase signal $\phi5$ establishes this connection accordingly.

The invention is not limited to the embodiments described above, but all changes and modifications thereof not constituting departures from the spirit and scope of the invention are intended to be covered by the following claims:

I claim:

1. A device for testing the brakes of an automobile, or the like, comprising:
   a pair of roll means respectively for engagement with the front or with the rear wheels of the automobile to be tested, and having moment of inertia representative of an average automobile inertia;

two motor means for driving the roll means of the pair, each of the motor means having flat, essentially constant, speed-torque characteristics in a particular range of torques;

first means connected to be individually responsive to the electric power input of the two motors during essentially constant speed operation thereof, and providing first signals representing the individual reaction of the motors to the application of the brakes;

second means connected to provide second signals representative of the roll characteristics of the roll means as the motor means cease to supply torque to the roll means and as the roll means are in frictionally retarded engagement with the wheels upon application of the brakes;

circuit means connected to the first and second means for operating the first and second means in sequence; and indicating means connected to the first and second means to provide indications of the first and second signals as the circuit means operate the first and second means.

2. A device as set forth in claim 1, including means coupled to the brake pedal of the automobile to provide a signal in representation of the force applied to the brake pedal;

means connected for providing a signal representing the ratio of the brake pedal force signal and of at least one of the first signals; and means connected for providing a separate indication of the ratio signal.

3. A device as set forth in claim 2, the ratio signal representing the ratio of the sum of the first signals over the brake pedal signal.

4. A device as set forth in claim 1, including means connected to the first means and responsive to particular first signals produced when the brakes are not applied and means connected to utilize the particular first signals to modify the first signals during the application of the brakes so as to compensate for rolling friction between the roll means and the wheels.

5. The device as set forth in claim 1, the second means including pulse generators providing two trains of pulses respectively at a rate representing the speed of the pair of roll means, the indicating means being a pair of integrator counters.

6. The device as set forth in claim 5, including means responsive to an adjusting value representing deviation of the actual inertia of the automobile from the average for altering the amplitude of the pulses.

7. The device as set forth in claim 1, including means responsive to signals as provided by the second means to provide sum and difference of the second signals and further providing signals representing the sum-to-difference ratio for indication thereof.

8. Device as set forth in claim 1, the two motor means having essentially linear power input vs. torque characteristic, the two first electrical signals being directly representative of the torques as provided respectively by the two motor means upon driving the roll means of the pair, the second means being coupled to the roll means of the pair for deriving therefrom a pair of second signals respectively representative of the speed of the roll means;

the device further including third means connected to the second means for integrating the second electrical signals individually to obtain a pair of third signals representing distance of roll of the roll means, as brakes are applied after the motor means have ceased to drive the roll means; and fourth means connected to the first and third means for individually electrically processing the first and third signals to provide sum and difference of the first signals as well as of the third signals and providing indications representative thereof.

9. The device as set forth in claim 1, including means responsive to the force of the brake pedal to provide a signal representative thereof;

means connected for integrating the latter signal as the circuit means operate the second means; and means for indicating the integrated signal at least after the roll means have stopped.

10. A device for testing the brakes of an automobile or the like, comprising:

first means including a pair of roll means for respective engagement with a pair of axially aligned wheels of the automobile, further including motor means coupled to each of the roll means for individually driving the roll means of the pair;

second means operatively connected to the input of the motor means for concurrently providing two electrical signals respectively representing the torques of the motor means in representation of the reaction of the motor means to the application of the brakes and separately as to each of the two wheels of the pair;

third means connected to the second means for being responsive to the two signals and providing sum and difference signals thereof, to provide indication of average effect and of unbalance the brakes have on the wheels; and fourth means connected to the third means for providing a ratio between the sum and difference signals.

11. A device for testing the brakes of an automobile or the like, comprising:

first means including at least one roll means for engagement with each of a pair of axially aligned wheels of the automobile, further including means to impart a particular speed upon the roll means and the wheels coupled thereto;

second means operatively coupled to the wheels or the rolls means to provide first and second signals representative of the distance the wheels of the pair have traveled subsequent to termination of speed as imparted by the means included in the first means;

third means connected to the second means for being responsive to the two signals, providing third and fourth signals respectively being sum and difference of the two signals provided by the second means; and including fourth means connected to provide an indication of the ratio between the third and fourth signals.

12. A device as set forth in claim 11, the third means including a Hall generator having voltage-sensing electrodes and current input electrodes, the Hall generator being magnetically energized by said sum signal;

an amplifier having input terminals connected to receive the first and second electrical signals, further connected respectively to the two voltage-sensing electrodes of the Hall generator to receive the Hall voltage;

circuit means connected to the amplifier and to the current input electrodes of the Hall generator, for controlling the energizing current to the Hall generator so that the voltage across the voltage-sensing electrodes is representative of the difference between the two signals; and means connected to provide an indication of said current in representation of the difference-to-sum ratio.

13. A device for testing the brakes of an automobile or the like, comprising:

first means including roll means for respective engagement with at least one wheel of the automobile, further including motor means coupled to the roll means for driving the same;

second means operatively connected to the first means for providing a first signal representing the reaction of the first means to application of the brakes to the wheels of an automobile;

third means coupled to the brake pedal of the automobile and providing a second signal representing the force as applied to the pedal; and circuit means connected to the second and third means to provide an indication of the ratio between the first and second signals.

14. A device as set forth in claim 13, and including means responsive to reaction of the first means when the brakes are not applied to provide a particular signal representing the reaction of the first means to rolling friction between the roll means and the wheel, and circuit means responsive to the particular signal, storing same and controlling the first signal during application of the brakes to eliminate therefrom the influence the rolling friction has on the reaction.

15. A device as set forth in claim 13, the circuit means including a first circuit means connected to receive the second signal for providing a magnetic field in response thereto and in representation of a divisor;
   a Hall generator in the magnetic field and connected to receive an energizing current;
   second circuit means including amplifier means connected to receive the Hall generator voltage and the first signal to represent a dividend and producing an output for providing said energizing current; and
   means for providing an indication of the energizing current in representation of the ratio.

16. In a testing device for testing the brakes of an automobile, the combination comprising:
   roll means positioned for engagement with a wheel of an automobile to be tested;
   electric motor means coupled to the roll means for driving the roll means and operable in accordance with the introduction of current and voltage to the motor means;
   first circuit means coupled to the motor means and individually responsive to the voltage and current applied to the motor means at any instant and providing signals representative thereof and with regard to their true phase relation;
   second circuit means connected to the first circuit means for providing a multiplication of the signals as provided by the first circuit means to provide a signal representative of the power input to the motor;
   means connected to the second circuit means and responsive to the power input to the motor prior to the application of any brake force for indicating the effect of rolling friction of the automobile; and
   means responsive to the signal representative of the power input to the motor and the indication of the effect of rolling friction of the automobile for indicating brake effort independent of any rolling friction of the automobile.

17. A device for testing the brakes of an automobile or the like, comprising:
   first means including at least one roll means for engagement with at least one wheel of the automobile, further including power means to impart a particular speed upon the wheel;
   second means connected to the first means to derive therefrom first signals representing interaction between the first means and the wheel upon application of the brake to the wheel;
   third means coupled to the brake pedal to provide a signal representing the brake force as applied;
   fourth means connected to the third means to provide a second signal representing the integral of the brake pedal signal during a particular period of brake force application; and
   means connected to provide indication of the first signal and of the integral of the second signal.

18. A device as set forth in claim 17, the second means including means operatively coupled to the wheel or the roll means to provide the first signals as representation of distance the wheel has traveled subsequent to cessation of operation of the power means up to stopping of the wheel, by operation of brake force application.

19. A device for testing the brakes of an automobile or the like, comprising:
   first means including roll means for respective engagement with at least one wheel of the automobile, further including motor means coupled to the roll means for driving the same;
   second means operatively connected to the first means for providing a first signal representing the reaction of the first means in the absence of the application of the brakes to the wheels, and including means (a) for storing the first signals, the second means further providing second signals representing the reaction of the first means to application of brakes to the wheels of an automobile, the second means further including means (b) connected to the means (a) and operating in further response to the second signals for forming the difference between the second and the first signals; and
   third means connected to provide an indication of the difference.

20. A device as set forth in claim 19, the first means including means for storing the first signal to be available as fixed parameter during production of the second signal as a variable parameter during variation of force with which the brakes are applied.

21. An apparatus for testing the brakes of automobiles,
   roll means for engagement with at least one wheel of the automobile;
   motor means coupled to the roll means for driving the roll means at a particular speed;
   first means coupled to the motor means for providing an indication of the power required for the motor to drive the roll means at the particular speed against the rolling friction of the automobile and without any application of any force to the brakes of the automobile; and
   second means connected in a feedback circuit with the first means for subtracting from the indication of the first means the power indication provided by the first means.

22. In the apparatus set forth in claim 21 wherein
   a brake force is applied to the automobile, and
   third means coupled to the first means for providing an indication of the effect only of the brake force applied to the automobile.

23. In the apparatus set forth in claim 22,
   fourth means operatively coupled to the first means for providing adjustments in the indications from the first means in accordance with variations in the weight of the automobile.

24. In the apparatus set forth in claim 22,
   means responsive to movements of the automobile above a particular speed for obtaining an indication by the fourth means of the effect of the brake force applied to the automobile.

25. In apparatus for testing the brakes of automobiles wherein a brake force is applied to the automobile,
   roll means for engagement with at least one wheel of the automobile,
   motor means coupled to the roll means for driving the roll means at a particular speed;
   first means operatively coupled to the motor means for disconnecting the motor means from the roll means; and
   second means operatively coupled to the first means and the roll means for measuring the effect on the movement of the roll means of the application of the brake force to the automobile after the disconnection of the motor means from the roll means.

26. In the apparatus set forth in claim 25,
   the second means including means responsive to the application of brake forces only above a particular value for obtaining the operation of the second means in measuring the effect on the movement of the roll means of the application of the brake force after the disconnection of the motor means from the brake means.

27. In the apparatus set forth in claim 25,
   the second means being constructed to measure the rate at which the roll means moves after the application of the brake force.

28. In the apparatus set forth in claim 27,
the second means being constructed to measure the distance through which the roll means travels after the application of the brake force to the automobile.

29. In the apparatus set forth in claim 28,
third means constructed to indicate when the roll means is moving below a particular value and the second means being responsive to the indication by the third means to indicate the distance through which the roll means have moved.

30. In the apparatus set forth in claim 25,
third means operatively coupled to the second means for adjusting the operation of the second means in accordance with the weight of the automobile.

31. In the apparatus set forth in claim 25,
the second means being operative to measure the integral of the brake force applied to the automobile.

32. In the apparatus set forth in claim 31,
the second means also being constructed to measure the distance through which the roll means travels after the application of the brake force and being further constructed to measure the ratio of the travel distance to the integral of the brake force.

33. In apparatus for testing the brakes of automobiles wherein a brake force is applied to the automobile,
roll means for engagement with at least one wheel of the automobile;
motor means coupled to the roll means for driving the automobile at a particular speed;
first means operatively coupled to the roll means for disengaging the motor means from the roll means;
second means operatively coupled to the roll means for indicating when the roll means has stopped after the application of the braking force to the automobile; and
third means operatively coupled to the roll means for indicating the distance through which the roll means has traveled before it stops.

34. In the apparatus set forth in claim 33,
the third means including means for indicating the rate at which the roll means is moving at each instant and further including means for integrating such indication of rate to provide an indication of the distance through which the roll means has traveled before it stops.

35. In the apparatus set forth in claim 34,
means for indicating the application of brake forces above a particular value and means responsive to the brake forces above a particular value and means responsive to the brake force for integrating the brake force and means responsive to the indication of the distance and the integral of the brake force for indicating the ratio of the distance to the integral of the brake force.

36. In a testing device for testing the brakes of an automobile, the combination comprising:
roll means positioned for engagement with a wheel of an automobile to be tested;
electric motor means coupled to the roll means for driving same;
first circuit means coupled to the input circuit for the motor means and individually responsive to voltage and current as applied to the motor means at any instant as the motor means drives the roll means, and providing signals representative thereof and with regard to their true phase relation;
second circuit means connected to the first circuit means for providing a multiplication of the signals as provided by the first circuit means to provide a signal representative of the power input of the motor; and
means connected to the second circuit means to be responsive to the power-representing signal to process the signal and to provide indication of brake effort if exerted upon the wheel,
the motor means being connected to a three-phase system, the first circuit means including an inductance connected across two of the three phases and having a center tap, a transformer having its primary connected between a tap of the inductance and the third phase, the secondary of the transformer providing a voltage representing the voltage of the third phase to a phantom reference point of the three phases.

37. In a testing device for testing the brakes of an automobile, the combination comprising:
roll means positioned for engagement with a wheel of an automobile to be tested;
electric motor means coupled to the roll means for driving same;
first circuit means coupled to the input circuit for the motor means and individually responsive to voltage and current as applied to the motor means at any instant as the motor means drives the roll means, and providing signals representative thereof and with regard to their true phase relation;
second circuit means connected to the first circuit means for providing a multiplication of the signals as provided by the first circuit means to provide a signal representative of the power input of the motor; and
means connected to the second circuit means to be responsive to the power-representing signal to process the signal and to provide indication of brake effort if exerted upon the wheel,
the second circuit means including a Hall generator magnetically excited by one of the signals and electrically excited by the respective other one of the signals as provided by the first means.

38. In a testing device for testing the brakes of an automobile, the combination comprising:
roll means positioned for engagement with a wheel of an automobile to be tested;
electric motor means coupled to the roll means for driving same;
first circuit means coupled to the input circuit for the motor means and individually responsive to voltage and current as applied to the motor means at any instant as the motor means drives the roll means, and providing signals representative thereof and with regard to their true phase relation;
second circuit means connected to the first circuit means for providing a multiplication of the signals as provided by the first circuit means to provide a signal representative of the power input of the motor;
means connected to the second circuit means to be responsive to the power-representing signal to process the signal and to provide indication of brake effort if exerted upon the wheel;
the means responsive to the power-representing signal including an amplifier with direct and inverting input; and
signal storage means connected temporarily to the amplifier to receive a signal and permanently connected to one of the inputs of the amplifier to provide a nulling signal thereto corresponding to the received signal as stored, the power-representing signal being continuously applied to the respective other input of the amplifier.

* * * * *